United States Patent [19]

Brekner et al.

[11] Patent Number: 5,707,728
[45] Date of Patent: Jan. 13, 1998

[54] MAGNETO-OPTICAL RECORDING MEDIUM

[75] Inventors: Michael-Joachim Brekner, Frankfurt am Main; Egon Hellstern, Waldems-Niederems; Christoph Weber, Dreieich, all of Germany

[73] Assignee: Ticona GmbH, Kelsterbach, Germany

[21] Appl. No.: 452,514

[22] Filed: May 30, 1995

Related U.S. Application Data

[63] Continuation of Ser. No. 974,856, Nov. 10, 1992, abandoned.

[30] Foreign Application Priority Data

Nov. 14, 1991 [DE] Germany ............. 41 37 427.4

[51] Int. Cl.⁶ .................. G11B 5/66; B32B 5/16
[52] U.S. Cl. .............. 428/332; 428/336; 428/694 ML; 428/694 SC; 428/694 DE; 428/694 RE; 428/694 NF; 428/694 XS; 428/694 RL; 428/694 SL; 428/900; 526/127; 526/132; 526/160; 526/281; 526/283; 526/308; 427/127; 427/128; 427/129
[58] Field of Search .............. 428/694 DE, 694 NF, 428/694 XS, 694 RL, 900, 694 ML, 694 SC, 694 RE, 332, 336, 694 SL; 526/127, 132, 160, 281, 283, 306; 427/127, 126, 129

[56] References Cited

U.S. PATENT DOCUMENTS

| | | | |
|---|---|---|---|
| 4,614,778 | 9/1986 | Kajiura et al. ............. | 526/281 |
| 4,649,519 | 3/1987 | Sun et al. ................. | 365/122 |
| 4,670,353 | 6/1987 | Sakurai ................... | 428/606 |
| 4,694,358 | 9/1987 | Muchnik et al. ........... | 360/59 |
| 4,740,430 | 4/1988 | Frankenthal et al. ....... | 428/630 |
| 4,923,765 | 5/1990 | Takayama et al. .......... | 428/694 ML |
| 5,087,677 | 2/1992 | Brekner et al. ............ | 526/160 |

FOREIGN PATENT DOCUMENTS

| | | |
|---|---|---|
| 0 217 096 | 4/1987 | European Pat. Off. . |
| 0 225 141 | 6/1987 | European Pat. Off. . |
| 0 227 480 | 7/1987 | European Pat. Off. . |
| 0 229 292 | 7/1987 | European Pat. Off. . |
| 0 310 680 | 4/1989 | European Pat. Off. . |
| 350010 | 1/1990 | European Pat. Off. . |
| 0 387 016 | 9/1990 | European Pat. Off. . |
| 0 387 017 | 9/1990 | European Pat. Off. . |
| 406569 | 1/1991 | European Pat. Off. . |
| 407 870 | 1/1991 | European Pat. Off. . |
| 454 079 | 10/1991 | European Pat. Off. . |
| 33 09 483 | 9/1983 | Germany . |
| 35 36 210 | 4/1986 | Germany . |
| 36 42 161 | 6/1988 | Germany . |
| 2 175 160 | 11/1986 | United Kingdom . |

OTHER PUBLICATIONS

Kryder "Stability of Perpendicular Domains in Thermomagnetic Recording Materials," *SPIE*, vol. 84, pp. 236–241 (1983).

Takayama et al., "Magnetic and Magneto–Optical Properties of Tb–Fe–Co Amrphous Films," *J. Appl. Phys.*, vol. 61, No. 7, pp. 2610–2616 (Apr. 1987).

Asari et al., "Preparation of a Magneto–Optical Disk using a Rare Earth–Transition Metal Alloy Target," *J. Vac. Sci. Technol. A*, vol. 5, No. 4, pp. 1949–1951 (Jul./Aug. 1987).

Schultheiss et al., "Production Technology for Magnetooptic Data Storage Media," *Solid State Technology*, (Mar. 1988).

Takahashi et al., "Study on Recorded Domain Characteristics of Magneto–Optical TbFeCo Disks," *J. Appl. Phys.* vol. 64, No. 1, pp. 262–269 (Jul. 1988).

*Primary Examiner*—Leszek Kiliman
*Attorney, Agent, or Firm*—Foley & Lardner

[57] ABSTRACT

A magneto-optical recording medium containing a substrate formed from polymers which are prepared by polymerization without ring cleavage, of monomers comprising polycyclic olefins, such as norbornene, results in a recording medium having increased thermal dimensional stability and resistance to hydrolysis, and decreased moisture absorption and birefringence.

28 Claims, 1 Drawing Sheet

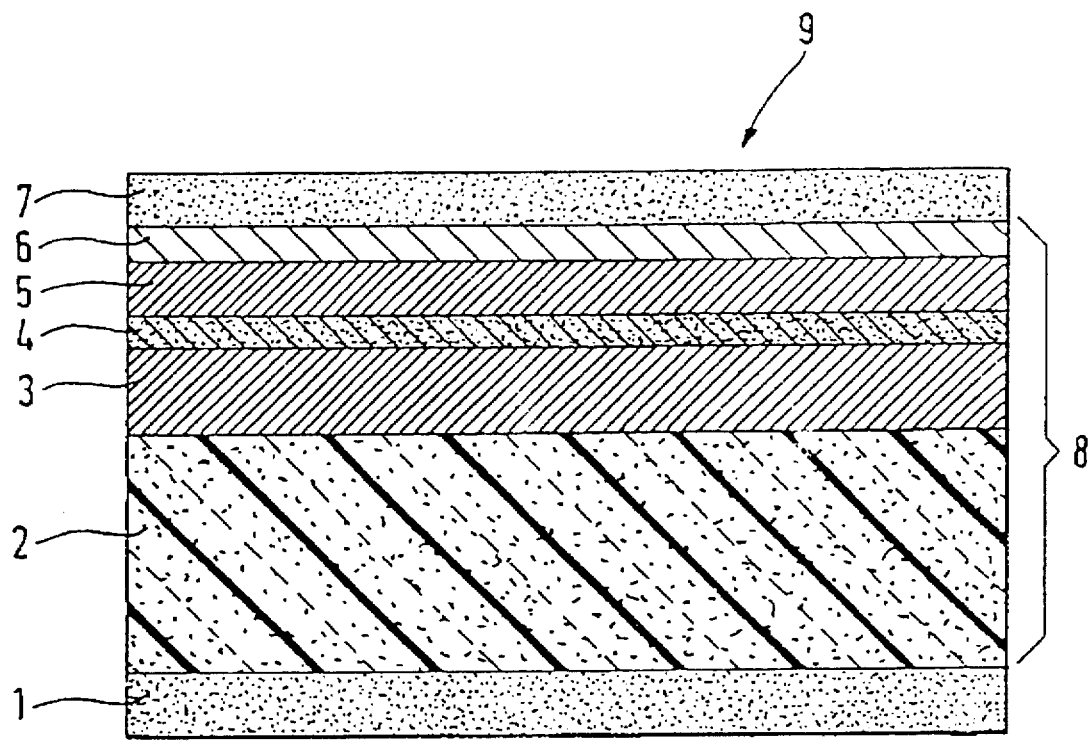

MAGNETO-OPTICAL RECORDING MEDIUM

This application is a continuation of application Ser. No. 07/974,856, filed Nov. 10, 1992, now abandoned.

BACKGROUND OF THE INVENTION

1. Field of the Invention

The invention relates to a magneto-optical recording medium, which generally contains at least four layers which are placed one on top of the other on a substrate, wherein the four layers comprise two dielectric layers, a reflector layer, and a magneto-optical recording layer.

2. Description of Related Art

Known amorphous magneto-optical recording layers generally have uniaxial vertical anisotropy. Most widely used are alloys of rare earth metals, such as gadolinium, terbium, dysprosium, and transition metals, such as iron and cobalt, to which further components may also have been added. The magnetic properties of these alloys depend to a very great extent on their composition.

German Offenlegungsschrift 3,309,483 describes magneto-optical recording materials comprising amorphous ternary alloys based on terbium, iron and cobalt and, for cobalt contents $\leq 40\%$, having an approximately linear relationship of the angle of Kerr rotation and of the Curie temperature with the cobalt content of the alloys. The same applies to the magneto-optical recording media which are described in German Offenlegungsschrift 3,536,210 and in Journal of Applied Physics, 64 (1988), page 262. Thus, German Offenlegungsschrift 3,536,210 describes a magneto-optical recording medium comprising an amorphous film composed of rare earth and transition metals and having a compensation temperature of 50° to 200° C. or 0° C. or less. When an amorphous film of the Tb—Fe—Co system is used, the compensation temperature of 50° to 200° C. is reached by a composition with 24 to 30 atom percent of terbium, and 7 to 20 atom percent of cobalt, the remainder being iron, while a compensation temperature of 0° C. or less is achieved by a composition with 18 to 21.5 atom percent of terbium and 8 to 10 atom percent of cobalt, the remainder being iron. These relationships are explained in detail in German Offenlegungsschrift 3,536,210.

In Journal of Applied Physics, 61 (1987), page 2610 et seq., and J. Vac. Sci. Technol. A5 (1987), page 1949 et seq., it is pointed out that, for example, an increase in the terbium content by 1 atom percent can shift the compensation temperature by up to 40° C.

Controlling the composition of the layer is therefore very important for the design of the sputter process and a corresponding production plant, as described in Solid State Technology, March 1988, page 107.

It is generally stated that the deviation of the Tb concentration from the mean concentration of the layer volume should be less than 0.5%.

The required uniformity of composition of the alloy components in the depth profile of a magneto-optical recording layer and the endeavors to keep the alloy composition constant over the width and length of the coating entail considerable control; for example, during coating, the disks to be coated rotate about their own axis but also revolve about a larger circle.

A further disadvantage of known magneto-optical recording materials is their high susceptibility to corrosion.

To avoid or prevent this disadvantage, the addition of various corrosion-preventing elements to the magneto-optical alloys is recommended (GB-A-2,175,160 and EP-A1-0 229 292). The addition of such elements to the total volume of the magneto-optical recording layer improves the corrosion resistance, but at the expense of other desired properties. Such desired properties include as large a Kerr angle as possible, a high coercive force, high recording sensitivity, a large signal-to-noise ratio, and the like. In the case of the magneto-optical recording medium according to EP-A1-0 229 292, further corrosion-preventing elements are added to a first element in order to achieve concentration of the corrosion-preventing element at the surface of the recording medium. The disadvantage here is that the desired magneto-optical properties may be very adversely affected by the addition of further elements.

U.S. Pat. No. 4,740,430 describes thin barrier layers of corrosion-preventing elements. This gives a discrete, multilayer structure of the magneto-optical recording medium.

In order to achieve a high storage density of magneto-optical recording materials, it must be possible to produce in the magneto-optical recording layer stable domains which are as small as possible. A precondition for this is that the product of the saturation magnetization $M_S$ and the coercive force $H_c$ should be as large as possible (Kryder et al., *SPIE Proc.* 420: 236 (1983)). For known magneto-optical recording materials, as large as possible a product of the saturation magnetization and the coercive force is achieved only in a narrow temperature range around the compensation temperature $T_{comp}$.

Recently, magneto-optical recording materials have been described which are suitable for direct overwriting of information (U.S. Pat. No. 4,694,358, U.S. Pat. No. 4,649,519, EP-A2-0 225 141, EP-A2-0 227 480 and EP-A2-0 217 096). In all cases, the structure used for the magneto-optical recording medium is one in which two separate layers having different magnetic properties are placed one on top of the other.

EP-A2-0 217 096 and EP-A2-0 227 480 describe magneto-optical recording media in which a thermally insulating intermediate layer is present in the structure, between the magneto-optical recording layer and a magnetic layer which produces a magnetic biassing field. The other above-mentioned publications recommend such intermediate layers, since otherwise diffusion of alloy components into the magnetic layer may occur. Of course, such diffusion of alloy components changes the properties of the magneto-optical recording medium.

Another procedure for increasing the long-term stability of a magneto-optical store is proposed in the method according to German Offenlegungsschrift 3,642,161, in which heating is carried out during and/or after deposition of a dielectric layer, of a magneto-optical layer and of a cover layer in succession on a substrate in a virtually dry atmosphere in a temperature range from room temperature to just below the crystallization temperature of the magneto-optical layer.

In connection with the accuracy of reproduction of the recorded information and the long-term stability of magneto-optical recording media, it has been found that the plastic substrates generally used comprising polycarbonate, polymethyl methacrylate, epoxy resin, polysulfone, polyether sulfone, polyetherimide and similar materials are particularly important since, for example, the thermal dimensional stability and the birefringence of such substrate materials substantially influence the accuracy of reproduction of the information, and the moisture absorption of these materials substantially influences the corrosion properties and hence the long-term stability of the physical properties of the recording layers.

The substrate materials comprising known plastic have inherent birefringence, i.e., anisotropy of the molecular polarizability, which is due, for example, to the plastic chains oriented in a certain direction of the substrate material. Two coherent linearly polarized light waves whose electric vectors pass, in directions oriented at right angles to one another, through a substrate material or a substrate sheet, are refracted to different extents owing to the different polarizabilities of the molecules, resulting in a phase shift of the waves. The magnitude of the phase difference is determined by the distance travelled by the wave through the disk and the difference between the two different refractive indices. Birefringence itself as a measure of the anisotropy of the molecular polarizability is given by the difference between the two refractive indices. Owing to the orientation states of such plastic chains in the substrate material, the birefringence in different directions may assume different values.

EP-A-0 310 680 describes a recording medium having a substrate which comprises an amorphous ethylene/tetracyclododecene copolymer and carries a magneto-optical recording layer comprising a quaternary amorphous rare earth/transition metal alloy of Tb, Fe and Co with Pt or Pd as further alloy components. Moreover, this document also discloses five-component alloys of Pd, Nd, Dy, Fe and Co or Pd, Tb, Gd, Fe and Co as magneto-optical recording layers.

EP-A-0 387 016, Example 4, discloses a magneto-optical recording layer comprising $Te_{50}Ge_{40}Cr_{10}$, which is deposited by sputtering onto a substrate comprising an amorphous copolymer of ethylene with 1,4,5,8-dimethano-1,2,3,4,4a,5,8,8a-octahydronaphthalene (tetracyclododecene), abbreviated DMON. Further known materials for substrates are polymer alloys of polycarbonate and polystyrene and cycloolefin polymers, as described in U.S. Pat. No. 4,614,778 and in EP-A-0 387 018, column 5, lines 5 to 24.

SUMMARY OF THE INVENTION

It is an object of the invention to improve a multi-layer recording medium for the recording and reproduction of data, in such a way that the thermal dimensional stability and the resistance to hydrolysis are increased and the moisture absorption and birefringence of the substrate material are reduced.

In accomplishing the foregoing objective, there has been provided, in accordance with one aspect of the present invention, a magneto-optical recording medium containing a first and second dielectric layer, a reflector layer, a magneto optical recording layer, and a substrate, wherein the substrate comprises a homopolymer or copolymer formed by the polymerization, without ring cleavage, of a monomer mixture comprising at least one polycyclic olefin monomer of the formula I, II, III, IV, V or VI

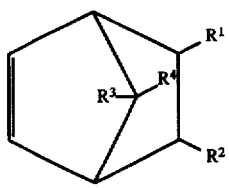

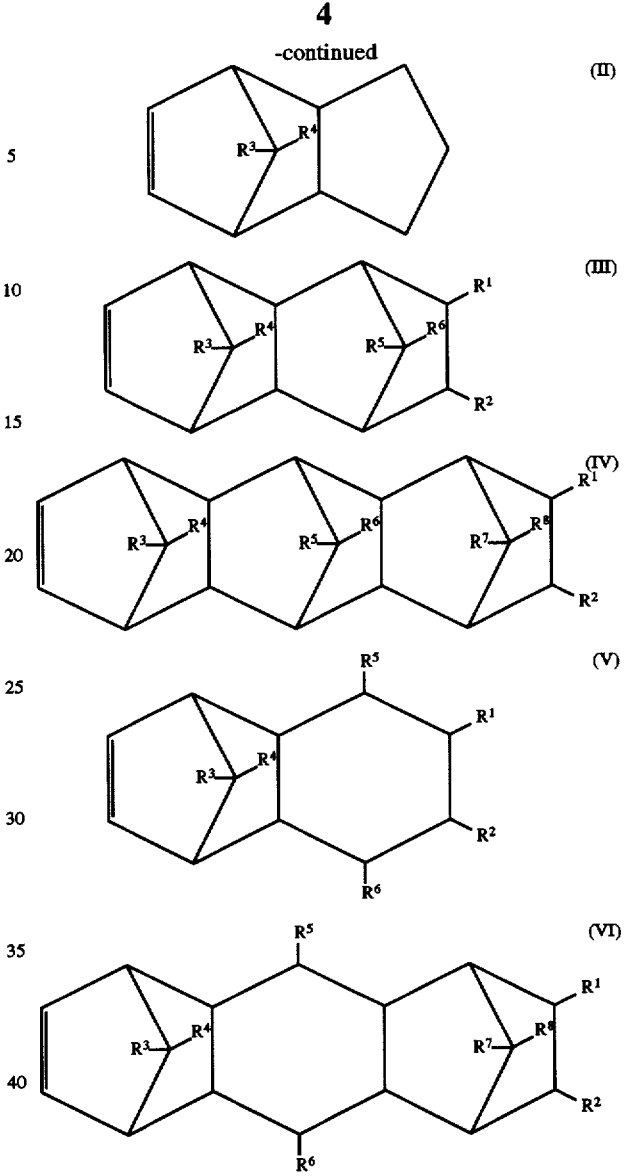

in which $R^1$, $R^2$, $R^3$, $R^4$, $R^5$, $R^6$, $R^7$ and $R^8$ are identical or different, and are a hydrogen atom or a $C_1$–$C_8$-alkyl radical, and identical radicals may have a different meaning in the different formulae.

In accordance with another aspect of the invention, there is provided a magneto-optical recording medium having a recording layer comprising an alloy which has the composition $[Tb_xFe_yCo_{1-x-y}]_{1-a}M_a$ in which $0.20 \leq x \leq 0.28$, $0.64 \leq y \leq 0.72$, $0 \leq a \leq 0.10$, and M is an element selected from the group consisting of Pt, Se and Cr.

Further objects, features, and advantages of the present invention will become apparent from the detailed description of preferred embodiments that follows.

BRIEF DESCRIPTION OF THE DRAWINGS

FIG. 1 shows schematically a section through a magneto-optical recording medium according to the invention.

DETAILED DESCRIPTION OF THE PREFERRED EMBODIMENTS

Any magneto-optical recording layer known in the art can be used as the recording layer in the present invention. In a preferred embodiment of the invention, the magneto-optical recording layer of the recording medium comprises an amorphous rare earth/transition metal alloy containing the transition metals Fe and Co and at least one rare earth metal selected from Gd, Tb, or Dy. This recording layer has an axis of easy magnetization at right angles to the surface and a thickness of between 18 and 30 nm, and contains at least one further element selected from Pt, Se or Cr as part of the alloy. The thickness of the magneto-optical recording layer is advantageously 23 to 28 nm.

The invention is described in detail below with reference to an embodiment which is illustrated in FIG. 1.

A storage disk 9 comprises a recording medium 8 which is provided on both sides with an additional coating film 1 and 7. The two coating films are cured with the aid of ultraviolet radiation. Coating film 1 on the base of the recording medium 8 is intended, in particular, to increase the scratch resistance, and reduce the accumulation of dust on the front of the storage disk 9 during disk operation, resulting in better reliability of the reproduction of the data from the recording medium 8. Coating film 7 serves, in particular, for mechanical protection of the recording medium 8.

The magneto-optical recording medium 8 of this embodiment comprises at least a four-layer structure which is placed on a substrate 2 in disk form. The layers may be arranged in any desired order. In particular, the four-layer structure on the substrate 2 comprises, for example, a dielectric layer 3, a magneto-optical recording layer 4, a further dielectric layer 5 and a reflector layer 6. It is also possible for the reflector layer 6 and the upper dielectric layer 5 to be interchanged so that the reflector layer 6 is present directly on the magneto-optical recording layer 4.

It should be understood that the recording medium of FIG. 1 is exemplary, and that other magneto-optical recording media can be used so long as they contain a substrate as described below.

The substrate 2 comprises a homopolymer or copolymer formed by the polymerization, without ring cleavage, of a monomer mixture comprising at least one polycyclic olefin monomer of the formula I, II, III, IV, V or VI

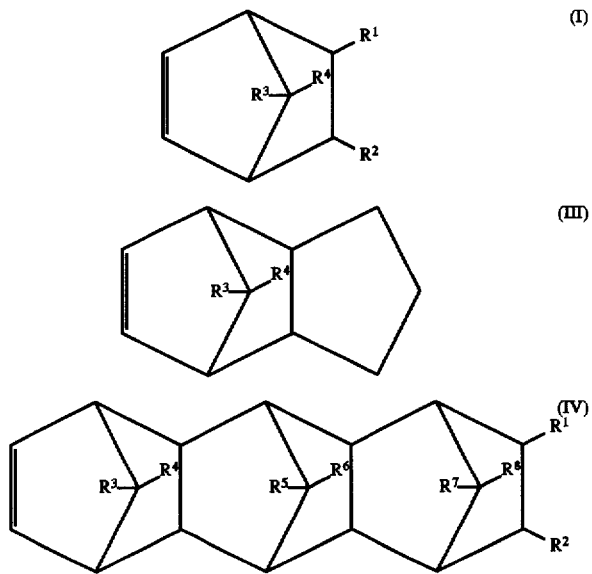

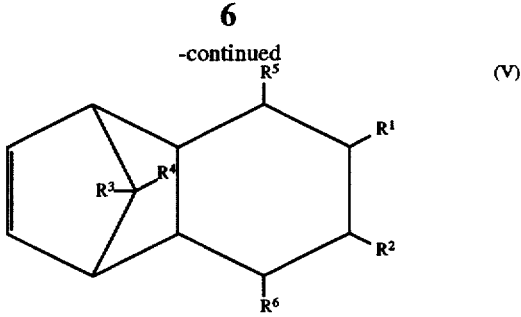

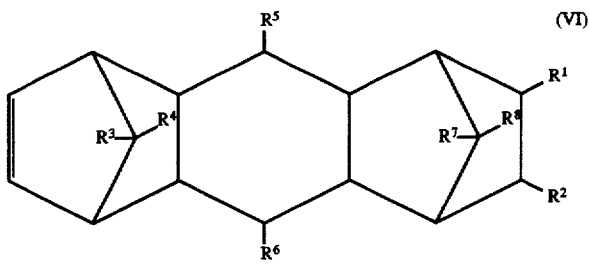

in which $R^1$, $R^2$, $R^3$, $R^4$, $R^5$, $R^6$, $R^7$ and $R^8$ are identical or different, and are a hydrogen atom or a $C_1$–$C_8$-alkyl radical, and identical radicals may have a different meaning in the different formulae. Polymerization "without ring cleavage" means polymerization under conditions selected to avoid substantial ring cleavage, and under which ring cleavage is negligible.

Other monomers can be polymerized with one or more of monomers (I)–(VI) to form, for example, co- or terpolymers useful as the substrate.

For example, the material of the substrate 2 may additionally incorporate, as a further polymerization comonomer, a cycloolefin monomer of the formula VII

in which n is an integer from 2 to 10. In addition, the substrate 2 may contain, as a further polymerization comonomer, an acyclic 1-olefin of the formula VIII

in which $R^9$ and $R^{10}$ are identical or different, and are a hydrogen atom or a $C_1$–$C_8$-alkyl radical.

The cycloolefin copolymers preferably used for the substrate, abbreviated as COC below, are cycloolefins such as norbornene/ethylene or tetracyclododecene (DMON)/ethylene copolymers. They are in particular copolymers of norbornene and ethylene which have thermal dimensional stability for a range of the glass transition temperature of 140° C. to 200° C. In contrast to the basic COC types, other norbornene derivatives may also be copolymerized with different 1-olefins. Alloys or blends of different COC types and mixtures of COC polymers with other polymers can also be used as the substrate.

Typically, the substrate 2 is formed from polymers of polycyclic olefins by polymerization, without ring cleavage, of 0.1 to 100 percent by weight, based on the total amount of the monomers, of a monomer mixture comprising at least one of the monomers of the formula I, II, III, IV, V or VI; 0 to 99.0% by weight, based on the total amount of monomers, of a cycloolefin of the formula VII; and 0 to 99.9% by weight, based on the total amount of the monomers, of at least one acyclic 1-olefin of the formula VIII. The preferred range for the cyclic monomers of the formula I, II, III, IV, V, VI and VII is 30 to 70% by weight of the total amount of the monomers, correspondingly the acyclic monomer VIII is in the range from 69.9 to 29.9% by weight. The particularly preferred range for the cyclic monomer of the formula I, II, III, IV, V, VI and VII is from 40 to 60% by weight of the total amount of the monomer; correspondingly, the acyclic monomer of the formula VIII is in the range from 59.9 to 39.9% by weight.

The useful properties of the substrate containing the COC polymers may be summarized as follows:

the material is amorphous and has a glass transition temperature of up to about 200° C.;

is colorless and transparent;

has thermal dimensional stability for a range of the glass transition temperature of about 140° to about 200° C.;

a density of about 1.01 to about 1.03 g/cm³;

the refractive index is about 1.52 to about 1.54;

the water absorption at 23° C. and 85% relative humidity is less than about 0.04%;

the modulus of elasticity is about 3.2 to about 3.6 GPa;

the breaking stress is about 40 to about 66 MPa;

the material is soluble in toluene, xylene, cyclohexane, Exxsol (hydrogenated diesel fraction), chloroform and diethyl ether;

the material is insoluble in water, alcohols, ketones (acetone), esters and amides (DMF, DMAC, NMP);

the material has chemical resistance to aqueous and concentrated acids, such as HCl and $H_2SO_4$, and bases, such as NaOH and KOH.

A further property of the basic COC types is their low inherent birefringence, i.e., the low anisotropy of the molecular polarizability, and their resistance to hydrolysis.

Norbornene/ethylene copolymers are preferred to DMON/ethylene copolymers because a level of high isotropy of the polarizability is achieved in norbornene/ethylene copolymers at higher glass transition temperatures than in the case of DMON/ethylene copolymers.

Any known process can be used to synthesize the COC polymer used in the present invention. Examples of the synthesis of individual COC types and the description of the process for the preparation of COC types by means of mass polymerization using special metallocene catalysts appear in German Patent Application P 40 36 264.7.

The German Patent Application describes bulk polymerization using special metallocene catalysts for the preparation of cycloolefin polymers by polymerization of polycyclic olefin monomers at temperatures of from 20° to 150° C. and at a pressure of from 0.01 to 64 bar, in the presence of a catalyst which comprises an aluminoxane of the formula IX

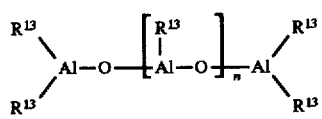  (IX)

for the linear type and/or of the formula X

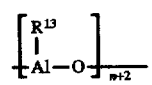  (X)

for the cyclic type, where, in the formulae IX and X, $R^{13}$ is a $C_1$–$C_6$-alkyl group, phenyl or benzyl, and n is an integer from 2 to 50, and a metallocene of the formula XI

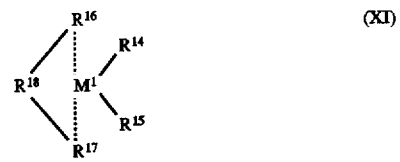  (XI)

in which $M^1$ is titanium, zirconium, hafnium, vanadium, niobium or tantalum, $R^{14}$ and $R^{15}$ are identical or different and are a hydrogen atom, a halogen atom, a $C_1$–$C_{10}$-alkyl group, a $C_1$–$C_{10}$-alkoxy group, a $C_6$–$C_{10}$-aryl group, a $C_5$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group, $R^{16}$ and $R^{17}$ are a monocyclic or polycyclic hydrocarbon radical which can form a sandwich structure with the central atom $M^1$, $R^{18}$ is

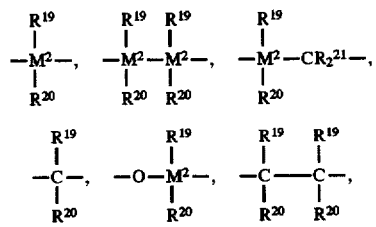

$=BR^{19}$, $=AlR^{19}$, —Ge—, —Sn—, —O—, —S—, $=So$, $=SO_2$, $=NR^{19}$, $=CO$, $=PR^{19}$ or $=P(O)R^{19}$ where $R^{19}$, $R^{20}$ and $R^{20}$ and $R^{21}$ are identical or different and are a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-alkylaryl group, a $C_8$–$C_{40}$-arylalkenyl group, or a $C_7$–$C_{40}$-alkylaryl group, or $R^{19}$ and $R^{20}$ or $R^{19}$ and $R^{21}$, in each case with the atoms connecting them, form a ring, and $M^2$ is silicon, germanium or tin, which comprises carrying out the polymerization in the liquid cycloolefin monomer or cycloolefin monomer mixture or in an at least 95 percent by volume cycloolefin solution, the substituents $R^{16}$ and $R^{17}$ in the formula XI being different from one another.

Polymerization using catalysts based on metallocenes is preferred because of the safety of these compounds. Processes using vanadium-based catalysts are particularly unsafe. Vanadium is extremely toxic and, as a rule traces of vanadium remain behind in the substrate material, necessitating special safety measures when the latter is recycled.

As previously mentioned, any magneto-optical recording layer known in the art can be used in the present invention. Preferably, the magneto-optical recording layer is a rare earth/transition metal alloy which has, for example, a composition according to the formula

in which M is an element selected from Pt, Se and Cr, and wherein $0.20 \leq x \leq 0.28$; $0.64 \leq y \leq 0.72$; and $0.001 \leq a \leq 0.10$.

In another embodiment of the magneto-optical recording layer 4, the composition of the rare earth/transition metal alloy is $(Tb_xFe_yCo_{1-x-y})_{1-b}Cr_b$, in which $0.22 \leq x \leq 0.28$, $0.58 \leq y \leq 0.70$ and $0.03 \leq b \leq 0.08$. For the alloy component Cr, for example, about 6 atom percent is particularly preferred in the alloy of terbium-iron-cobalt, so that the latter has, for example, the composition $Tb_{0.22}Fe_{0.65}Co_{0.07}Cr_{0.06}$.

The preferred alloys used in the recording layer contain chromium in the range from 3.0 to 8.0 atom percent, based on the total alloy, platinum in the range from 0.7 to 5, in particular 1 to 3, atom percent, or selenium in the range from about 1 to about 10 atom percent. Such rare earth/transition metal alloys containing platinum have, for example, the composition $(Tb_xFe_yCo_{1-x-y})_{1-c}Pt_c$ in which $0.22 \leq x \leq 0.28$, $0.64 \leq y \leq 0.70$ and $0.007 \leq c \leq 0.05$, in particular $0.01 \leq c \leq 0.03$. Such alloys containing selenium preferably have the composition $(Tb_xFe_yCo_{1-x-y})_{1-d}Se_d$, in which x and y are defined as with the platinum alloy and $0.01 \leq d \leq 0.10$.

Other magneto-optical recording layers such as those comprising one of the rare earth/transition metal alloys GdFeCo, TbGdFeCo, TbDyFeCo, TbGdDyCo or GdTbDyFeCo, are also suitable for the recording medium 8.

Any known dielectric layers can be used in the recording medium of the present invention. The two dielectric layers 3 and 5 which enclose the magneto-optical recording layer 4 are usually produced from the same compound, but it is also possible to use different materials for the two dielectric layers. Suitable materials include nitrides, such as $SiN_x$, in which $0.9 \leq x \leq 1.4$, SiON, SiAlON, AlN, AlON or oxides such as $Ta_2O_5$, $TaO_x$ or $NbO_x$ in which $1 \leq x \leq 2$.

The thicknesses of the dielectric layers may be identical or different, and vary depending on the intended use of the medium. The thickness of the first dielectric layer 3, which is between the substrate 2 and the magneto-optical recording layer 4, is generally in the range from 30 to 140 nm, in particular in the range from 50 to 80 nm. At a thickness of the dielectric layer 3 in the range from 30 to 140 nm, the refractive index n is between 1.9 and 2.2. At a thickness of the dielectric layer 3 of 50 to 80 nm, the refractive index n is in the range from 2.0 to 2.1. The thickness of the second dielectric layer 5, which is arranged between the magneto-optical recording layer 4 and the reflector layer 6, is in general slightly smaller than the thickness of the first dielectric layer 3, and is generally in the range from 10 to 60 nm, the refractive index n being 1.9 to 2.2. A thickness of the second dielectric layer 5 in the range from 25 to 40 nm is preferred, with a refractive index n in the range from 2.0 to 2.1.

A further suitable material for the second dielectric layer 5 is, inter alia, aluminum nitride, having a thickness of 20 to 50 nm.

Any known reflector can be used as such layer in the present recording medium. For example, the reflector layer may contain as base metal Al, Cu, Ag or Au. In particular, the reflector layer 6 may comprise aluminum, with the addition of a metal selected from zirconium, tantalum, titanium and/or chromium. The alloying of this further metal with the aluminum reflector layer 6 is preferably effected so that the two metals have concentration gradient at right angles to the surface of reflector layer 6. The concentration gradient being defined as the ratio of percent weight of the metal within the reflector layer to the percent weight of the base metal in the reflector layer.

The thickness of the reflector layer may be selected depending on the intended utility of the medium, and is generally 20 to 80 nm.

What is claimed is:

1. A magneto-optical recording medium containing a first and second dielectric layer, a reflector layer, a magneto-optical recording layer, and a substrate, wherein the substrate comprises a homopolymer or copolymer formed by mass polymerization, without ring cleavage, of a monomer mixture comprising at least one polycyclic olefin monomer of the formula I, II, III, IV, V or VI

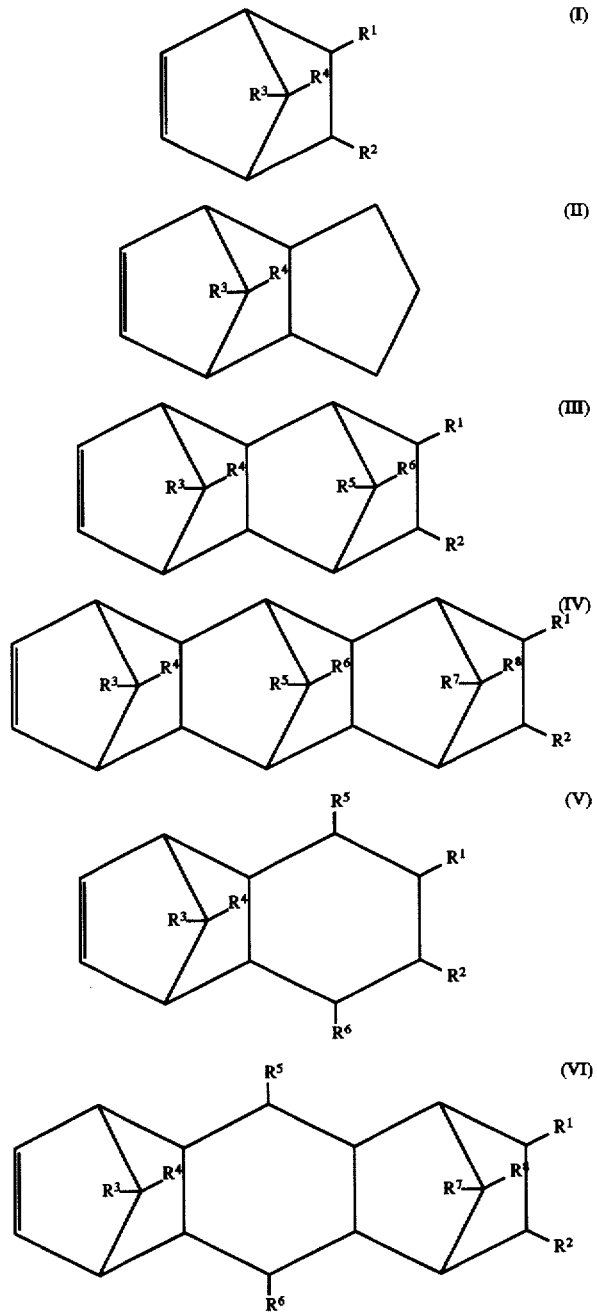

in which $R^1$, $R^2$, $R^3$, $R^4$, $R^5$, $R^6$, $R^7$ and $R^8$ are identical or different, and are a hydrogen atom or a $(C_1-C_8)$-alkyl radical, wherein the substrate is prepared by bulk polymerization of the monomer mixture at a temperature of from 20° to 150° C. and at a pressure of from 0.01 to 64 bar, in the presence of a catalyst which comprises a metallocene and an aluminoxane which is of the formula IX

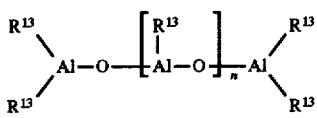

or of the formula X

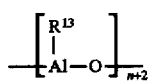

where, in the formulae IX and X, $R^{13}$ is a $C_1$–$C_6$-alkyl group, phenyl or benzyl, and n is an integer from 2 to 50, and said metallocene is of the formula XI

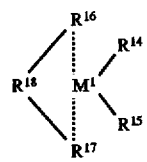

in which $M^1$ is titanium, zirconium, hafnium, vanadium, niobium or tantalum, $R^{14}$ and $R^{15}$ are identical or different and are a hydrogen atom, a halogen atom, a $C_1$–$C_{10}$-alkyl group, a $C_1$–$C_{10}$-alkoxy group, a $C_6$–$C_{10}$-aryl group, a $C_5$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group, $R^{16}$ and $R^{17}$ are a monocyclic or polycyclic hydrocarbon radical which can form a sandwich structure with the central atom $M^1$, $R^{18}$ is

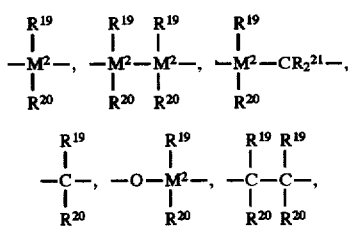

$=BR^{19}, =AlR^{19}, -Ge-, -Sn-, -O-, -S-, =So,$ $=SO_2, =NR^{19}, =CO, =PR^{19}$ or $=P(O)R^{19}$ where $R^{19}$, $R^{20}$ and $R^{20}$ and $R^{21}$ are identical or different and are a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_6$–$C_{40}$-alkylaryl group, a $C_8$–$C_{40}$-arylalkenyl group, or a $C_7$–$C_{40}$-alkylaryl group, or $R^{19}$ and $R^{20}$ or $R^{19}$ and $R^{21}$, in each case with the atoms connecting them, form a ring, and $M^2$ is silicon, germanium or tin, and wherein the substituents $R^{16}$ and $R^{17}$ in the formula XI are different from one another;

wherein the magneto-optical recording layer comprises an alloy containing at least one transition metal selected from the group consisting of Fe and Co, at least one rare earth metal selected from the group consisting of Gd, Tb, and Dy and at least one further element selected from the group consisting of Pt, Se, and Cr, wherein the recording layer has an axis of easy magnetization at right angles to an upper surface of the recording medium and a thickness of between about 18 and about 30 nm.

2. A magneto-optical recording medium as claimed in claim 1, wherein the polymer is a norbornene/ethylene copolymer or a tetracyclododecene/ethylene copolymer.

3. A magneto-optical recording medium as claimed in claim 1, wherein the first dielectric layer is located between the substrate and the magneto-optical recording layer, the magneto-optical recording layer is located between the first and second dielectric layers, and the second dielectric layer is located between the magneto-optical layer and the reflector layer.

4. A magneto-optical recording medium as claimed in claim 1, wherein the thickness of the magneto-optical recording layer is about 23 to about 28 nm.

5. A magneto-optical recording medium as claimed in claim 1, wherein the polymer is formed from a cycloolefin monomer of the formula VII

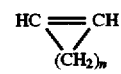

in which n is an integer from 2 to 10.

6. A magneto-optical recording medium as claimed in claim 1, wherein the polymer is formed from at least one acyclic 1-olefin monomer of the formula VIII

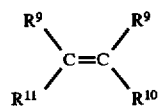

in which $R^9$, $R^{10}$, $R^{11}$, and $R^{12}$ are identical or different and are a hydrogen atom or a ($C_1$–$C_8$)-alkyl radical.

7. A magneto-optical recording medium as claimed in claim 1, wherein the substrate comprises a mixture of different polymers, each polymer formed from at least one of said monomers (I)–(VI).

8. A magneto-optical recording medium as claimed in claim 1, wherein the copolymer comprises a copolymer of a 1-olefin with at least one of said polycyclic olefins.

9. A magneto-optical recording medium as claimed in claim 1, wherein the polymer is formed from 0.1 to 100% by weight, based on the total weight of the monomers, of the monomers of said formula I, II, III, IV, V or VI;

0 to 99.0% by weight, based on the total weight of the monomers, of a cycloolefin of the formula VII

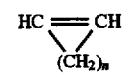

in which n is an integer from 2 to 10, and 0 to 99.9% by weight, based on the total amount of the monomers, of at least one acyclic 1-olefin of the formula VIII

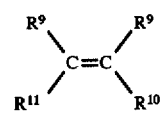

in which $R^9$, $R^{10}$, $R^{11}$ and $R^{12}$ are identical or different, and are a hydrogen atom or a ($C_1$–$C_8$)-alkyl radical.

10. A magneto-optical recording medium as claimed in claim 1, wherein the alloy has the composition

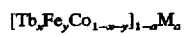

in which $0.20 \leq x \leq 0.28$, $0.64 \leq y \leq 0.72$, $0.001 \leq a \leq 0.10$, and M is an element selected from the group consisting of Pt, Se, and Cr.

11. A magneto-optical recording medium as claimed in claim 1, wherein the recording layer comprises one of the rare earth/transition metal alloys selected from the group consisting of GdFeCo, TbGdFeCo, TbDyFeCo, TbGdDyCo, and GdTbDyFeCo, wherein the alloys further contain at least one of Pt, Se and Cr.

12. A magneto-optical recording medium as claimed in claim 1, wherein the second dielectric layer comprises aluminum nitride and has a thickness of about 20 to about 50 nm.

13. A magneto-optical recording medium as claimed in claim 1, wherein the reflector layer comprises a metal selected from the group consisting of Al, Cu, Ag and Au and its thickness is in the range from about 20 to about 80 nm.

14. A magneto-optical recording medium as claimed in claim 1, wherein the recording medium contains a protective coating film on the front and the back.

15. A magneto-optical recording medium as claimed in claim 2, wherein the polymer is a copolymer of norbornene and ethylene, which has a thermal dimensional stability for a range of the glass transition temperature of about 140° C. to about 200° C.

16. A magneto-optical recording medium as claimed in claim 3, wherein the first and second dielectric layers independently comprise $SiN_x$, SiON, SiAlON, AlN, AlON, $Ta_2O_5$, $TaO_x$ or $NbO_x$, in which $0.9 \leq x \leq 1.4$ for $SiN_x$ and $1 \leq x \leq 2$ for $TaO_x$ and $NbO_x$.

17. A magneto-optical recording medium as claimed in claim 10, wherein the alloy has the composition

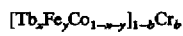

in which $0.22 \leq x \leq 0.28$, $0.58 \leq y \leq 0.70$, and $0.03 \leq b \leq 0.08$.

18. A magneto-optical recording medium as claimed in claim 10, wherein the alloy has the composition

19. A magneto-optical recording medium as claimed in claim 10, wherein the alloy has the composition

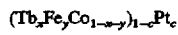

in which $0.22 \leq x \leq 0.28$, $0.64 \leq y \leq 0.70$, and $0.007 \leq c \leq 0.05$.

20. A magneto-optical recording medium as claimed in claim 10, wherein the alloy has the composition

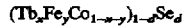

in which $0.22 \leq x \leq 0.28$, $0.64 \leq y \leq 0.70$, and $0.01 \leq d \leq 0.10$.

21. A magneto-optical recording medium as claimed in claim 11, wherein the alloy comprises at least one of chromium in the range from about 3 to about 8 atom %, platinum in the range from about 0.7 to about 5, particularly 1 to 3 atom %, or selenium in the range from about 1 to about 10 atom %.

22. A magneto-optical recording medium as claimed in claim 13, wherein the reflector layer comprises aluminum and a metal selected from the group consisting of Zr, Ta, Ti, and Cr.

23. A magneto-optical recording medium as claimed in claim 16, wherein the thickness of the first dielectric layer is about 30 to about 140 nm and the refractive index n is about 1.9 to about 2.2.

24. A magneto-optical recording medium as claimed in claim 16, wherein the thickness of the second dielectric layer is about 10 to about 60 nm and the refractive index n is about 1.9 to about 2.2.

25. A magneto-optical recording medium as claimed in claim 23, wherein the thickness of the first dielectric layer is about 50 to about 80 nm and the refractive index n is about 2.0 to about 2.1.

26. A magneto-optical recording medium as claimed in claim 24, wherein the thickness of the second dielectric layer is about 25 to about 40 nm and the refractive index n is about 2.0 to about 2.1.

27. A process for preparing a magneto-optical recording medium as claimed in claim 1 comprising preparing a substrate by bulk polymerization of the monomer mixture at a temperature of from 20° to 150° C. and at a pressure of from 0.01 to 64 bar, in the presence of a catalyst which comprises a metallocene and an aluminoxane which is of the formula IX

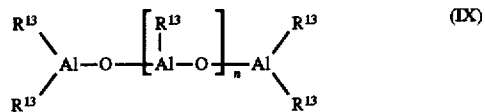

or of the formula X

where, in the formulae IX and X, $R^{13}$ is a $C_1$–$C_6$-alkyl group phenyl or benzyl, and n is an integer from 2 to 50, and said metallocene is of the formula XI

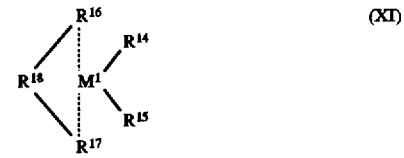

in which $M^1$ is titanium, zirconium, hafnium, vanadium, niobium or tantalum, $R^{14}$ and $R^{15}$ are identical or different and are a hydrogen atom, a halogen atom, a $C_1$–$C_{10}$-alkyl group, a $C_1$–$C_{10}$-alkoxy group, a $C_6$–$C_{10}$-aryl group, a $C_5$–$C_{10}$-aryloxy group, a $C_2$–$C_{10}$-alkenyl group, a $C_7$–$C_{40}$-arylalkyl group, a $C_7$–$C_{40}$-alkylaryl group or a $C_8$–$C_{40}$-arylalkenyl group, $R^{16}$ and $R^{17}$ are a monocyclic or polycyclic hydrocarbon radical which can form a sandwich structure with the central atom $M^1$, $R^{18}$ is

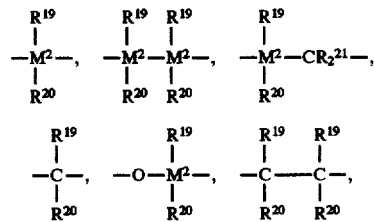

$=BR^{19}$, $=AlR^{19}$, —Ge—, —Sn—, —O—, —S—, $=$So, $=SO_2$, $=NR^{19}$, $=CO$, $=PR^{19}$ or $=P(O)R^{19}$ where $R^{19}$, $R^{20}$ and $R^{20}$ and $R^{21}$ are identical or different and are a hydrogen atom, a halogen atom, a $C_1$–$C_{10}$-alkyl group, a $C_1$–$C_{10}$-fluoroalkyl group, a $C_6$–$C_{10}$-fluoroaryl group, a $C_6$–$C_{10}$-aryl group, a $C_1$–$C_{10}$-alkoxy group, a $C_2$–$C_{10}$-alkenyl group, a $C_7$–$C_{40}$-alkylaryl group, a $C_8$–$C_{40}$-arylalkenyl group, or a $C_7$–$C_{40}$-alkylaryl group, or $R^{19}$ and $R^{20}$ or $R^{19}$ and $R^{21}$, in each case with the atoms connecting them, form a ring, and $M^2$ is silicon, germanium or tin, which comprises carrying out the polymerization in the liquid cycloolefin monomer or cycloolefin monomer mixture or in an at least 95 percent by volume cycloolefin solution, the substituents $R^{16}$ and $R^{17}$ in the formula XI being different from one another;

applying the first dielectric layer to the substrate, applying the magneto-optical recording layer to the first dielectric layer, applying the second dielectric layer to the magneto-optical layer, and applying the reflector layer to the second dielectric layer.

28. A process as claimed in claim 27, wherein the magneto-optical recording layer comprises an alloy containing at least one transition metal selected from the group consisting of Fe and Co, at least one rare earth metal selected from the group consisting of Gd, Tb, and Dy and at least one further element selected from the group consisting of Pt, Se, and Cr, wherein the recording layer has an axis of easy magnetization at right angles to an upper surface of the recording medium and a thickness of between about 18 and about 30 nm.

* * * * *